US012638677B2

(12) United States Patent
Hatakeyama

(10) Patent No.:　US 12,638,677 B2
(45) Date of Patent:　　May 26, 2026

(54) HEAD-UP DISPLAY SYSTEM

(71) Applicant: YAZAKI CORPORATION, Tokyo (JP)

(72) Inventor: Masaya Hatakeyama, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 332 days.

(21) Appl. No.: 18/451,054

(22) Filed: Aug. 16, 2023

(65) Prior Publication Data

US 2024/0069338 A1　　Feb. 29, 2024

(51) Int. Cl.
　　*G02B 27/01*　　　　(2006.01)
(52) U.S. Cl.
　　CPC .. *G02B 27/0101* (2013.01); *G02B 2027/0187* (2013.01)
(58) Field of Classification Search
　　CPC ........ G02B 27/0101; G02B 2027/0187; G02B 27/01; G09G 3/001
　　See application file for complete search history.

(56) References Cited

U.S. PATENT DOCUMENTS

| | | | |
|---|---|---|---|
| 10,996,924 B2 * | 5/2021 | Nicholson | ............. G06F 3/1446 |
| 2010/0079270 A1 * | 4/2010 | Krautter | ................ B60K 35/29 |
| | | | 340/436 |
| 2010/0253594 A1 * | 10/2010 | Szczerba | ................ G08G 1/167 |
| | | | 345/7 |
| 2017/0253181 A1 * | 9/2017 | Choi | ...................... B60K 35/29 |
| 2017/0269684 A1 | 9/2017 | Murai | |
| 2018/0068476 A1 * | 3/2018 | Ono | .................... G06F 3/04815 |
| 2019/0286227 A1 * | 9/2019 | Samadani | ............ G06T 19/006 |
| 2021/0300183 A1 * | 9/2021 | Kondo | ................ B60K 35/211 |

FOREIGN PATENT DOCUMENTS

JP　　　2017-170949 A　　　9/2017

* cited by examiner

*Primary Examiner* — William R Alexander
*Assistant Examiner* — Gabriel A Sanz
(74) *Attorney, Agent, or Firm* — KENEALY VAIDYA LLP

(57)　　　　ABSTRACT
An AR-HUD system includes an AR-HUD device and a line-of-sight detector. The AR-HUD device is disposed in a vehicle and emits display light toward a transmissive windshield to display a virtual image. The line-of-sight detector detects the line of sight of the driver of the vehicle. The AR-HUD device changes a display mode of displaying the virtual image in accordance with the position of the driver's line of sight detected by the line-of-sight detector.

2 Claims, 3 Drawing Sheets

40 (42)

CAMERA — 10

LINE-OF-SIGHT DETECTOR — 20

ILLUMI-NANCE SENSOR — 30

PROCESSOR — 421

NORMAL PROCESSING PORTION — 421a

EMPHASIZING PROCESSING PORTION — 421b

GUIDING PROCESSING PORTION — 421c

LUMINANCE ADJUSTER — 423

IMAGE GENERATOR — 422

VIRTUAL IMAGE

Q (Qa)          P1          P2          P3

HEAD-UP DISPLAY SYSTEM

CROSS-REFERENCE TO RELATED APPLICATION(S)

The present application claims priority to and incorporates by reference the entire contents of Japanese Patent Application No. 2022-133491 filed in Japan on Aug. 24, 2022.

BACKGROUND OF THE INVENTION

1. Field of the Invention

The present invention relates to a head-up display system.

2. Description of the Related Art

As a conventional head-up display system, for example, Japanese Patent Application Laid-open No. 2017-170949 discloses a vehicle display device displaying a virtual image on an object in a superimposed manner. This vehicle display device performs display in a first display mode for allowing the attribute of the object to be recognized or in a second display mode being a display mode for allowing the presence of the object to be noticed, and displays a virtual image in the first display mode if the display position of the virtual image is in a first region being a visual field where it is easy to acquire information as a driver's visual field and, on the other hand, displays the virtual image in the second display mode if the display position of the virtual image is in a second region outside the first region.

With the aforementioned vehicle display device disclosed in Japanese Patent Application Laid-open No. 2017-170949, if the driver's line of sight is located in the second region when the virtual image is displayed in the first region, for example, there is a risk that the virtual image is not recognized.

SUMMARY OF THE INVENTION

In light of the foregoing, an object of the present invention is to provide a head-up display system that allows a driver to properly recognize a virtual image.

In order to achieve the above mentioned object, a head-up display system according to one aspect of the present invention includes a head-up display device disposed in a vehicle and configured to display a virtual image by emitting display light toward a transmissive reflecting member; and a line-of-sight detector configured to detect a line of sight of a driver of the vehicle, wherein the head-up display device being configured to change a display mode of displaying the virtual image in accordance with a position of the line of sight of the driver detected by the line-of-sight detector.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode for implementing the present invention (embodiment) will be described in detail with reference to the drawings. Contents described in the following embodiment should not be construed to limit the present invention. Constituents described below include those that can be readily conceived by those skilled in the art and that are substantially the same. Configurations described below can be combined as appropriate. Various omissions, substitutions, or modifications of the configurations can be made without departing from the gist of the present invention.

Embodiment

Figure 1:
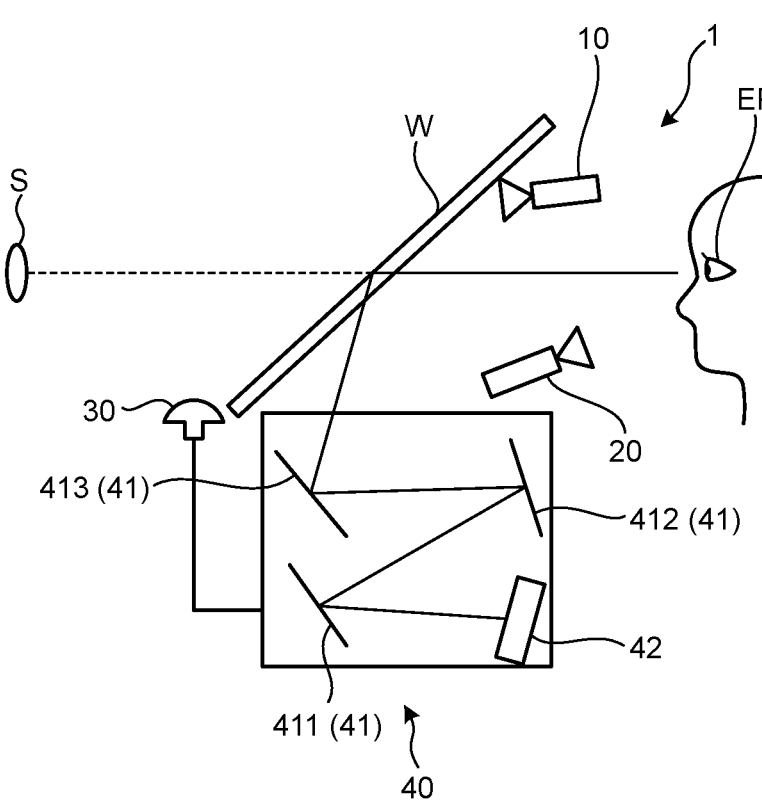
FIG. 1 is a schematic view illustrating an example configuration of an AR-HUD system according to an embodiment.

An AR-HUD system 1 according to an embodiment will be described with reference to the drawings. The AR-HUD system 1 is an example of head-up display system, is disposed in a vehicle, and emits display light toward a windshield W being a transmissive reflecting member to display a virtual image S reflected off the windshield W toward a visual check position EP side on an object in a superimposed manner. As illustrated in FIG. 1, the AR-HUD system 1 includes a camera 10, a line-of-sight detector 20, an illuminance sensor 30, and an AR-HUD device 40 being a head-up display device. The camera 10, the line-of-sight detector 20, the illuminance sensor 30, and the AR-HUD device 40 are communicably connected to each other.

The camera 10 captures an image. The camera 10 is disposed in the vehicle and placed with, for example, a camera lens facing the front side of the vehicle. The camera 10 captures a background of the front side of the vehicle where the virtual image S is to be superimposed and outputs a background image in which the background is captured to the AR-HUD device 40.

Next, the line-of-sight detector 20 will be described. The line-of-sight detector 20 detects the line of sight of the driver. The line-of-sight detector 20 is disposed in the vehicle and placed with, for example, a camera lens facing the driver. The line-of-sight detector 20 detects the driver's line of sight by a known line-of-sight detecting method. The line-of-sight detector 20 detects the driver's line of sight on the basis of the position of the pupil of an eyeball in a driver's face image, for example. In this case, the line-of-sight detector 20 compares a predetermined eye image with the driver's face image and detects the position of the driver's pupil in the driver's face image. A controller 22 detects the driver's line of sight from the detected position of the driver's pupil. The line-of-sight detector 20 outputs line-of-sight information indicating the detected line of sight to the AR-HUD device 40.

Next, the illuminance sensor 30 will be described. The illuminance sensor 30 is a sensor detecting the degree of brightness (illuminance). The illuminance sensor 30 is disposed in the vehicle and placed, for example, on the top surface of an instrument panel. The illuminance sensor 30 detects illuminance and outputs illuminance information indicating the detected illuminance to the AR-HUD device 40.

Next, the AR-HUD device 40 will be described. The AR-HUD device 40 displays the virtual image S. The AR-HUD device 40 is disposed in the vehicle and placed, for example, inside the instrument panel of the vehicle. The AR-HUD device 40 emits the display light toward the windshield W to display the virtual image S reflected off the windshield W toward the visual check position EP side on the object in a superimposed manner. The AR-HUD device 40 displays the virtual image S on the basis of the background image output from the camera 10, the line-of-sight information output from the line-of-sight detector 20, and the illuminance information output from the illuminance sensor 30, for example. As illustrated in FIG. 1, the AR-HUD device 40 includes a reflector 41 and a display device 42.

The reflector 41 reflects display light emitted from the display device 42 toward the windshield W. The reflector 41 includes a first intermediate mirror 411, a second intermediate mirror 412, and a final mirror 413. The first intermediate mirror 411 totally reflects the display light emitted from the display device 42 toward the second intermediate mirror 412. The second intermediate mirror 412 totally reflects the display light emitted from the display device 42 and reflected off the first intermediate mirror 411 toward the final mirror 413. The final mirror 413 totally reflects the display light emitted from the display device 42 and reflected off the first intermediate mirror 411 and the second intermediate mirror 412 toward the windshield W.

Figure 2:
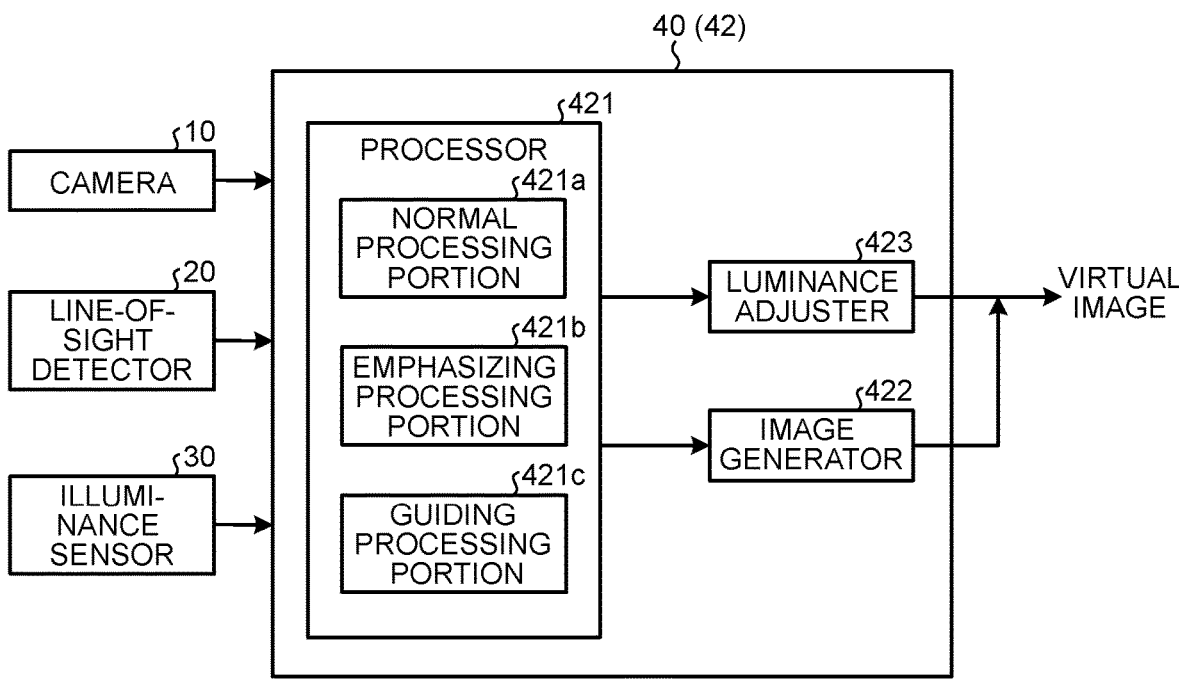
FIG. 2 is a block diagram illustrating an example configuration of the AR-HUD system according to the embodiment.

Next, the display device 42 will be described. The display device 42 emits the display light and emits the display light via the reflector 41 to the windshield W. As illustrated in FIG. 2, the display device 42 includes a processor 421, an image generator 422, and a luminance adjuster 423. The processor 421, the image generator 422, and the luminance adjuster 423 are communicably connected to each other.

Figure 3:
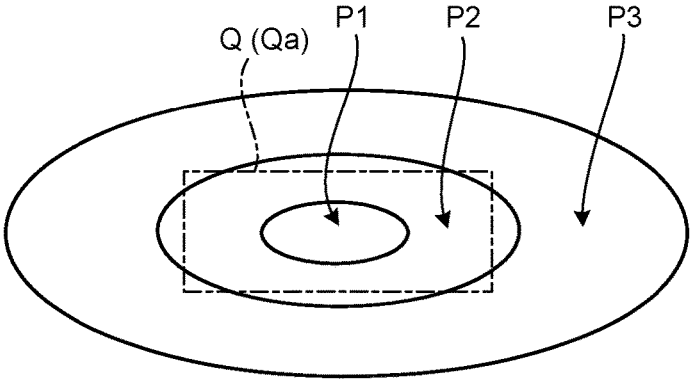
FIG. 3 is a diagram illustrating a central region, an effective region, and a guide region according to the embodiment.
Figure 4:
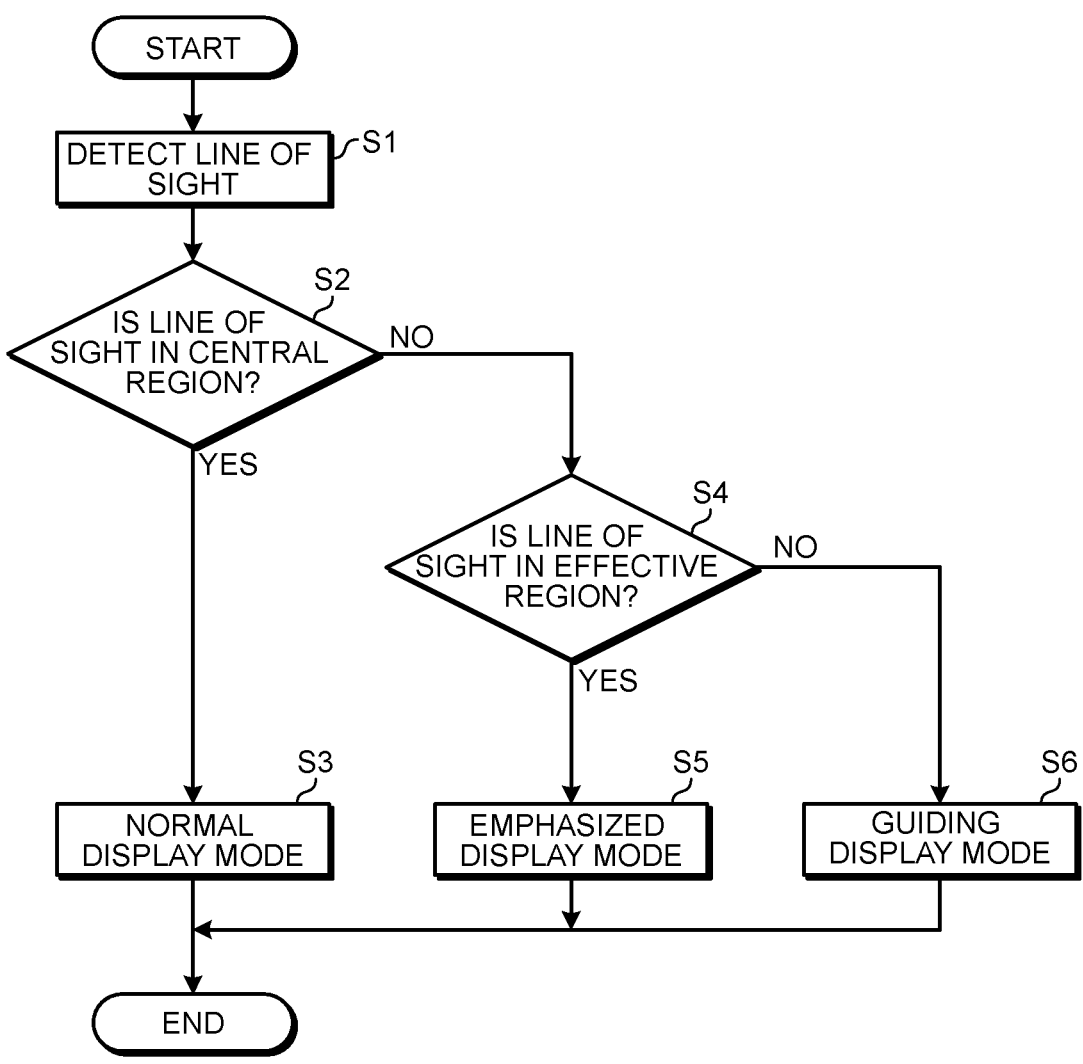
FIG. 4 is a flowchart illustrating an operation example of the AR-HUD system according to the embodiment.

The processor 421 performs display processing of the virtual image S. The processor 421, for example, detects an object (such as a person, another vehicle, or a sign) on which the virtual image S is to be superimposed, from the background image output from the camera 10, and superimposes the virtual image S on the detected object. Furthermore, the processor 421 changes a display mode of displaying the virtual image S on the basis of the line-of-sight information output from the line-of-sight detector 20. As illustrated in FIG. 3, the processor 421, for example, changes the display mode of displaying the virtual image S in accordance with the position of the driver's line of sight relative to a central region P1, an effective region P2, and a guide region P3.

Herein, the central region P1 is a preset region defined inside the effective region P2 and corresponding to a central visual field with respect to the driver's visual axis. The central region P1 is, for example, equivalent to a range of 0° to ±5° relative to the driver's visual axis when the driver sitting in the driver's seat faces forward. In other words, the central region P1 is equivalent to a vertical range of 0° to ±5° and a horizontal range of 0° to ±5° relative to the driver's visual axis. If the line of sight is located in the central region P1, the driver can clearly recognize the virtual image S displayed in the central region P1.

The effective region P2 is a preset region defined outside the central region P1 and corresponding to an effective visual field of the driver. The effective region P2 is, for example, equivalent to a range of ±5° to ±30° relative to the driver's visual axis when the driver sitting in the driver's seat faces forward. In other words, the effective region P2 is equivalent to a vertical range of ±5° to ±30° and a horizontal range of ±5° to ±30° relative to the driver's visual axis. If the line of sight is located in the effective region P2, the driver can make such recognition that the presence of the virtual image S displayed in the central region P1 is noticed.

The guide region P3 is a preset region defined outside the effective region P2 and corresponding to a guided visual field of the driver. The guide region P3 is, for example, equivalent to a range of ±30° to ±100° relative to the driver's visual axis when the driver sitting in the driver's seat faces forward. In other words, the guide region P3 is equivalent to a vertical range of ±30° to ±100° and a horizontal range of ±30° to ±100° relative to the driver's visual axis. If the line of sight is located in the guide region P3, it is difficult for the driver to recognize the presence of the virtual image S displayed in the central region P1.

At least a partial region of these regions, the central region P1, the effective region P2, and the guide region P3, overlaps the windshield W when viewed by the driver sitting in the driver's seat. A display range Q in which the virtual image S is displayed via the windshield W is a range overlapping at least the central region P1, and, in this example, as illustrated in FIG. 3, is a range centered on the central region P1 and also overlapping part of the effective region P2 and part of the guide region P3.

The processor 421 determines whether the driver's line of sight is located in the central region P1, the effective region P2, or the guide region P3 on the basis of the line-of-sight information output from the line-of-sight detector 20. The processor 421 then changes the display mode of displaying the virtual image S on the basis of the result of this determination. The processor 421 includes, as processing portions changing the display mode, a normal processing portion 421*a*, an emphasizing processing portion 421*b*, and a guiding processing portion 421*c*.

The normal processing portion 421*a* makes a change to a normal display mode in which the virtual image S is normally displayed in a predetermined normal display form. Herein, the predetermined display form of the virtual image S is a form in which design information, text information, and the like are displayed with no deformation (such as emphasis or enlargement). If the driver's line of sight is located in the central region P1 when the virtual image S is displayed in a range overlapping the central region P1 in the display range Q, the normal processing portion 421*a* performs processing of making a change to the normal display mode to normally display the virtual image S in the predetermined normal display form. The line of sight is toward the central region P1, so that the driver can clearly recognize the virtual image S displayed in the central region P1 in the normal display mode.

Next, the emphasizing processing portion 421*b* will be described. The emphasizing processing portion 421*b* makes a change to an emphasized display mode in which the virtual image S is displayed with emphasis in an emphasized display form that provides more emphasis than the normal display form. If the driver's line of sight is located in the effective region P2 when the virtual image S is displayed in the range overlapping the central region P1 in the display range Q, the emphasizing processing portion 421*b* performs processing of making a change to the emphasized display mode to display the virtual image S with emphasis in the emphasized display form in comparison to the case where the driver's line of sight is located in the central region P1. Herein, the emphasized display form of the virtual image S is a display form in which, in comparison to the predetermined display form of the virtual image S in the normal display mode, the size of the virtual image S is increased, the virtual image S is displayed in a visually attractive color (for example, red, yellow, or the like), the virtual image S flashes, and the luminance of the virtual image S is relatively high. When a change to the emphasized display mode is made, although the line of sight is toward the effective region P2, the virtual image S is displayed with emphasis in the emphasized display form, so that the driver can recognize the presence of the virtual image S displayed in the central region P1.

Next, the guiding processing portion 421c will be described. The guiding processing portion 421c makes a change to a guiding display mode to guide the driver's line of sight from the guide region P3 side to the central region P1 side. If the driver's line of sight is located in the guide region P3 when the virtual image S is displayed in the range overlapping the central region P1 in the display range Q, the guiding processing portion 421c performs processing of making a change to the guiding display mode to display a guiding virtual image in a portion including at least part of an outer frame Qa of the display range Q to guide the driver's line of sight from the guide region P3 side to the central region P1 side. The guiding virtual image is a virtual image differing from the virtual image S superimposed on the detected object and is displayed in the portion including at least part of the outer frame Qa of the display range Q. The guiding virtual image is displayed, for example, in a display form in which only the entire outer frame Qa of the display range Q is displayed, a display form in which the entire display range Q including the inside is displayed, a display form in which a guiding symbol is displayed in a portion including part of the outer frame Qa in the vicinity of the position of the driver's line of sight, and the like. In these display forms, a visually attractive color (for example, red, yellow, or the like), flashing display, relatively high luminance, and the like may be applied to the guiding virtual image. When a change to the guiding display mode is made, although the line of sight is toward the guide region P3, the guiding virtual image is displayed to guide the line of sight from the guide region P3 side to the central region P1 side, so that the driver can recognize the virtual image S displayed in the central region P1.

Next, the image generator 422 will be described. The image generator 422 generates an image for displaying the virtual image S on the basis of the result of the processing performed in each mode by the processor 421. For example, in the case of the normal display mode, the image generator 422 generates an image for normally displaying the virtual image S in the predetermined normal display form. In the case of the emphasized display mode, the image generator 422 generates an image for displaying the virtual image S with emphasis in the emphasized display form. In the case of the guiding display mode, the image generator 422 generates an image for normally displaying the virtual image S in the predetermined normal display form and an image for displaying the guiding virtual image.

Next, the luminance adjuster 423 will be described. The luminance adjuster 423 adjusts the luminance of an image. The luminance adjuster 423 adjusts the luminance of the image generated by the image generator 422 on the basis of the illuminance information output from the illuminance sensor 30. For example, the luminance adjuster 423 makes the luminance of the image generated by the image generator 422 relatively high if the illuminance information indicates relatively high illuminance, and makes the luminance of the image generated by the image generator 422 relatively low if the illuminance information indicates relatively low illuminance. The AR-HUD device 40 emits the display light including the image of which the luminance is adjusted by the luminance adjuster 423 toward the windshield W to display the virtual image S or the guiding virtual image on the front side of the vehicle.

Next, an operation example of the AR-HUD device 40 will be described with reference to the flowchart. In the AR-HUD device 40, the line-of-sight detector 20 detects the driver's line of sight (Step S1). The line-of-sight detector 20 detects the driver's line of sight on the basis of the position of the pupil of an eyeball in a driver's face image, for example. Then, the processor 421 determines whether the driver's line of sight is located in the central region P1 (Step S2). If the driver's line of sight is located in the central region P1 (Yes at Step S2), the processor 421 changes the display mode to the normal display mode (Step S3). The processor 421, for example, performs processing of normally displaying the virtual image S in the predetermined normal display form, with the normal processing portion 421a (Step S3). At Step S2 above, if the driver's line of sight is not located in the central region P1 (No at Step S2), the processor 421 determines whether the driver's line of sight is located in the effective region P2 (Step S4). If the driver's line of sight is located in the effective region P2 (Yes at Step S4), the processor 421 changes the display mode to the emphasized display mode (Step S5). The processor 421, for example, performs processing of displaying the virtual image S with emphasis in comparison to the case where the driver's line of sight is located in the central region P1, with the emphasizing processing portion 421b. In specific, the emphasizing processing portion 421b increases the size of the virtual image S, displays the virtual image S in a visually attractive color (for example, red, yellow, or the like), flashes the virtual image S, or makes the luminance of the virtual image S relatively high. At Step S4 above, if the driver's line of sight is not located in the effective region P2 (No at Step S4), the processor 421 changes the display mode to the guiding display mode (Step S6). The processor 421, for example, performs processing of displaying the guiding virtual image in the portion including at least part of the outer frame Qa of the display range Q to guide the driver's line of sight from the guide region P3 side to the central region P1 side, with the guiding processing portion 421c. After the processing at Step S3, S5, or S6 above, the AR-HUD device 40 ends the processing of displaying the virtual image S.

As described above, the AR-HUD system 1 of the embodiment includes the AR-HUD device 40 and the line-of-sight detector 20. The AR-HUD device 40 is disposed in a vehicle and emits the display light toward the transmissive windshield W to display the virtual image S. The line-of-sight detector 20 detects the line of sight of the driver of the vehicle. The AR-HUD device 40 changes the display mode of displaying the virtual image S in accordance with the position of the driver's line of sight detected by the line-of-sight detector 20. This configuration enables the AR-HUD system 1 to display the virtual image S in accordance with the position of the driver's line of sight, which allows the driver to properly recognize the virtual image S.

In the above AR-HUD system 1, the AR-HUD device 40 changes the display mode in accordance with the position of the line of sight relative to the central region P1, the effective region P2, and the guide region P3. Herein, the central region P1 is a preset region corresponding to the central visual field with respect to the driver's visual axis. The effective region P2 is a preset region defined outside the central region P1 and corresponding to the effective visual field of the driver. The guide region P3 is a preset region defined outside the effective region P2 and corresponding to the guided visual field of the driver. The display range Q in which the virtual image S is displayed overlaps at least the central region P1. If the driver's line of sight is located in the central region P1 when the virtual image S is displayed in the display range Q, the AR-HUD device 40 makes a change to the normal display mode in which the virtual image S is normally displayed in the predetermined normal display form. If the driver's line of sight is located in the effective region P2, the AR-HUD device 40 makes a change to the emphasized display mode in which the virtual image S is displayed with emphasis in the emphasized display form providing more emphasis than the normal display form, in comparison to the case where the driver's line of sight is located in the central region P1. If the driver's line of sight is located in the guide region P3 when the virtual image S is displayed in the display range Q, the AR-HUD device 40 makes a change to the guiding display mode to guide the driver's line of sight from the guide region P3 side to the central region P1 side by displaying the virtual image S in the portion including at least part of the outer frame Qa of the display range Q. This configuration enables the AR-HUD system 1 to display the virtual image S appropriately in accordance with the region where the driver's line of sight is located. For example, if the driver's line of sight is located in the central region P1, the AR-HUD device 40 allows the driver to clearly recognize the virtual image S displayed in the central region P1. If the driver's line of sight is located in the effective region P2, the AR-HUD system 1 allows recognition of the presence of the virtual image S displayed with emphasis in the central region P1. In other words, if the driver's line of sight is located in the effective region P2, the AR-HUD system 1 allows the driver to notice the presence of the virtual image S displayed with emphasis in the central region P1. If the driver's line of sight is located in the guide region P3, the AR-HUD system 1 can guide the driver's line of sight from the guide region P3 side to the central region P1 side with the guiding virtual image, which allows the driver to recognize the virtual image S displayed in the central region P1.

Note that the above description has exemplified the augmented reality head-up display device (AR-HUD device) 40 as the head-up display device; however, no such limitation is intended and the head-up display device may be, for example, a HUD device of a type other than the augmented reality type.

The example has been described in which the display range Q for displaying the virtual image S overlaps the central region P1, part of the effective region P2, and part of the guide region P3; however, no such limitation is intended and the display range Q may overlap the central region P1 and the effective region P2 but does not necessarily overlap the guide region P3, for example.

The example has been described in which the AR-HUD device 40 changes the display mode in accordance with the position of the line of sight relative to the central region P1, the effective region P2, and the guide region P3; however, no such limitation is intended and a change of the display mode may be made in accordance with the position of the line of sight relative to the central region P1 and the effective region P2 without using the guide region P3, for example. In this case, the AR-HUD device 40 changes the display mode in accordance with the position of the line of sight relative to the central region P1 and the effective region P2, and, if the driver's line of sight is located in the central region P1 when the virtual image S is displayed in the display range Q, makes a change to the normal display mode in which the virtual image S is normally displayed in the predetermined normal display form. If the driver's line of sight is located in the effective region P2, the AR-HUD device 40 makes a change to the emphasized display mode in which the virtual image S is displayed with emphasis in the emphasized display form providing more emphasis than the normal display form, in comparison to the case where the driver's line of sight is located in the central region P1. With this configuration, for example, if the driver's line of sight is located in the central region P1, the AR-HUD system 1 allows the driver to clearly recognize the virtual image S displayed in the central region P1. If the driver's line of sight is located in the effective region P2, the AR-HUD system 1 allows such recognition that the presence of the virtual image S displayed with emphasis in the central region P1 is noticed.

In the guiding display mode, the processor 421 may display a virtual image S having relatively high priority, in the display range Q. When the driver visually recognizes the virtual image S, the processor 421 may then delete the virtual image S that has been visually recognized.

The head-up display system according to the present embodiment can display a virtual image in accordance with the position of the driver's line of sight, which allows the driver to properly recognize the virtual image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-up display system comprising:
    a head-up display device disposed in a vehicle and configured to display a virtual image by emitting display light toward a transmissive reflecting member; and
    a line-of-sight detector configured to detect a line of sight of a driver of the vehicle, wherein
    the head-up display device being configured to change a display mode of displaying the virtual image in accordance with a position of the line of sight of the driver detected by the line-of-sight detector,
    the line-of-sight detector is configured to detect the line of sight relative to a central region, an effective region, and a guide region, the central region being a preset region when the driver is seated in the vehicle and the driver's line of sight is directed forward, and the effective region being a preset region defined outside the central region and coaxial with the central region, the guide region being a preset region defined outside the effective region and coaxial with the central region,
    the virtual image is displayed in a display range that overlaps at least the central region, the virtual image is within a field of view of the driver when the line of sight is in the central region or the effective region,
    at least a portion of the guide region is outside of the display range,
    the head-up display device is configured to, upon display of the virtual image in the display range, if the driver's line of sight is in the guide region, make a change to a guiding display mode configured to guide the line of sight of the driver from a side of the guide region to a side of the central region by displaying a second virtual image that is different from the virtual image, the head-up display device is configured to change the display mode in accordance with the position of the line of sight relative to the central region, the effective region, and the guide region, and the head-up display device is configured to, upon display of the virtual image in the display range:

if the line of sight of the driver is located in the central region, make a change to a normal display mode configured to normally display the virtual image in a predetermined normal display form; and if the line of sight of the driver is located in the effective region, make a change to an emphasized display mode configured to display the virtual image with emphasis in an emphasized display form in comparison to a case where the line of sight of the driver is located in the central region, the emphasized display form is provided with emphasis as compared to the normal display form.

2. The head-up display system according claim 1, wherein the second virtual image is any of:

an outer frame that surrounds the display range;

an image that fills an entirety of the display range; and a guiding symbol that is displayed in the display range, the guiding symbol includes a portion of the outer frame that is adjacent to the driver's line of sight.

*     *     *     *     *